(12) United States Patent  (10) Patent No.: US 8,181,402 B2
Tsuzuki et al.  (45) Date of Patent: May 22, 2012

(54) BUILDING-INTEGRATED PHOTOVOLTAIC POWER UNIT

(75) Inventors: Joji Tsuzuki, Takahama (JP); Shuichi Kobayashi, Takahama (JP); Kenji Yamauchi, Takahama (JP)

(73) Assignee: Yanegijutsukenkyujo Co., Ltd., Takahama, Aichi (JP)

( * ) Notice: Subject to any disclaimer, the term of this patent is extended or adjusted under 35 U.S.C. 154(b) by 161 days.

(21) Appl. No.: 12/752,422

(22) Filed: Apr. 1, 2010

(65) Prior Publication Data

US 2011/0239554 A1    Oct. 6, 2011

(51) Int. Cl.
    *E04D 13/18*    (2006.01)
(52) U.S. Cl. ...... 52/173.3; 52/656.1; 136/244; 126/621; 126/623
(58) Field of Classification Search ............... 52/20, 222, 52/173.3, 251, 586.1, 586.2, 582.1, 656.1, 52/665, 726.2; 136/244, 251, 291; 126/621, 126/622, 623, 704; 257/433
    See application file for complete search history.

(56) References Cited

U.S. PATENT DOCUMENTS

| | | | | |
|---|---|---|---|---|
| 5,571,338 A | * | 11/1996 | Kadonome et al. | 136/251 |
| 6,105,317 A | * | 8/2000 | Tomiuchi et al. | 52/173.3 |
| 6,959,517 B2 | * | 11/2005 | Poddany et al. | 52/173.3 |
| 7,465,873 B2 | * | 12/2008 | Nomura et al. | 136/244 |
| 7,618,310 B2 | * | 11/2009 | Daniels | 454/366 |
| 7,956,280 B2 | * | 6/2011 | Kobayashi | 136/251 |
| 2010/0236162 A1 | * | 9/2010 | Tweedie | 52/127.6 |
| 2011/0047903 A1 | * | 3/2011 | Kobayashi | 52/173.3 |
| 2011/0070765 A1 | * | 3/2011 | Kobayashi | 439/387 |

FOREIGN PATENT DOCUMENTS

JP    2002-61355 A    2/2002
JP    2009263875 A  * 11/2009

* cited by examiner

*Primary Examiner* — William Gilbert
*Assistant Examiner* — Jody Giacoman
(74) *Attorney, Agent, or Firm* — Apex Juris, pllc; Tracy M. Heims

(57) ABSTRACT

A building-integrated photovoltaic power unit comprising: a solar cell module including a solar panel, a functional member, and a frame body including a first frame formed with an installation part extending outward and holding the functional member and the opposing edges of the solar panel facing each other; a processed rafter including a supporting member, the processed rafters including processed rafters configured as a structure of a roof, each having a width to allow installation parts of different solar cell modules facing each other to be installed thereon in a state where supporting members are successively installed stepwise in a longitudinal direction; and a cap member fixed to the processed rafter including a ceiling part covering upper surfaces of the first frames of the solar cell modules installed such that the respective installation parts face each other on an upper surface of the processed rafter.

7 Claims, 8 Drawing Sheets

BUILDING-INTEGRATED PHOTOVOLTAIC POWER UNIT

BACKGROUND OF THE INVENTION

1. Field of the Invention

The present invention relates to a building-integrated photovoltaic power unit capable of constituting a roof of a building or the like.

2. Description of the Related Art

Photovoltaic power generation by installing roofing tiles equipped with solar cells or solar cell modules obtained by enclosing plate-shaped solar panels with a frame on the roof of a building or the like has been known. When solar cell modules are installed/constructed on the roof, there is a problem that working efficiency at a construction site is low and thus, it takes a long time because solar cell modules are arranged and installed after solar cell modules and bases or the like to install solar cell modules being carried onto the inclined roof.

Thus, a proposal is made to insert solar panels into lattices of a skeleton member formed like a grid by horizontal muntins and vertical muntins as a structure of a roof in a plant in advance and to place the unitized roof panels on the roof of a building.

Thereby, working efficiency at the construction site by unitizing solar panels as roof panels can be improved (Japanese Patent Application Laid-Open No. 2002-061355).

However, according to JP-A No. 2002-061355, after solar panels being inserted into lattices of a skeleton member together with a heat insulator such as Styrofoam, the solar panels are prevented from slipping out of the lattices only by a pressing member fixed on the upper surface of the skeleton member and thus, there is a problem that waterproof performance is degraded because if the heat insulator contracts due to a temperature change, aging or the like, a gap is formed between the solar panels and the pressing member.

Moreover, solar panels and the like are inserted into lattices of a skeleton member and thus, the inner circumference of lattices of a skeleton member is made a little larger than the outer circumference of solar panels so that solar panels and the like can securely be inserted into lattices. Therefore, a gap may be formed between solar panels and the inner circumference of the skeleton member and the solar panels are more likely to rattle due to the gap, so that there is a possibility that noise is produced by vibration of solar panels caused by a rainstorm or solar panels are more likely to be damaged due to vibration fatigue.

Further, as described above, a gap is formed between a skeleton member and solar panels or the like and the ratio of involvement of rigidity of solar panels and the like in unitized roof panels is low so that strength/rigidity of the whole unit will be determined by the skeleton member. Thus, it becomes necessary to make horizontal muntins and vertical muntins constituting the skeleton member thicker more than necessary or use materials with high strength/rigidity, posing a problem of high cost.

Thus, in view of the above circumstances, an object of the present invention is to provide a building-integrated photovoltaic power unit that can easily be produced in a plant and has excellent weather resistance and high strength/rigidity.

SUMMARY OF THE INVENTION

A building-integrated photovoltaic power unit according to the present invention comprises: a solar cell module including a solar panel in a flat shape, a functional member in a platy shape disposed below the solar panel, and a frame body including a first frame formed with an installation part extending outward and holding the functional member and the opposing edges of the solar panel facing each other, the frame body holding the functional member and the solar panel so as to enclose a peripheral end thereof; a processed rafter including a supporting member having a length corresponding to the solar cell module, the processed rafter including a plurality of processed rafters configured as a structure of a roof, each having a width to allow installation parts of first frames of different solar cell modules facing each other to be installed thereon in a state where a plurality of supporting members are successively installed stepwise in a longitudinal direction; and a cap member fixed to the processed rafter, the cap member including a ceiling part covering upper surfaces of the first frames of the solar cell modules installed such that the respective installation parts face each other on an upper surface of the processed rafter.

Here, the "functional member" includes a "member capable of providing predetermined strength/rigidity to a roof structure (for example, a sheathing roof board)", "member having sound insulation characteristics", and "member having fire protection characteristics, fireproof characteristics, or insulating characteristics".

The "length corresponding to the solar cell module" in the supporting member is a length in the range of 0.8 to 1 times the length of the solar cell module (on the side along the first frame) to be installed and is a length that does not allow formation of a gap between solar cell modules when viewed from a direction perpendicular to the surface of the solar cell modules after the solar cell module being installed on each supporting member of the stepwise processed rafter. The "processed rafter" includes a "rafter produced stepwise by processing timber, steel materials or the like", "rafter formed stepwise by successively installing triangular members on rod-shaped timber, steel materials or the like", and "rafter formed stepwise by arranging a plate-shaped sheathing roof board above a rod-shaped member (including a rafter) extending in a direction linking the eaves side and the ridge side of the roof and successively installing triangular members (stepwise formation members) on the sheathing roof board".

According to the present invention, a building-integrated photovoltaic power unit is configured by installing a solar cell module holding a solar panel and a functional member by a frame on a stepwise processed rafter and fixing a cap member by covering first frames of the solar cell modules installed on the processed rafter and therefore, it is only necessary to fix the cap member to the processed rafter after an installation part of the solar cell module being installed on a supporting member of the processed rafter, so that the building-integrated photovoltaic power unit can be constructed by the simple work of stacking each structural member and the unit can easily be produced in a plant or the like.

Moreover, the solar cell module is installed on the processed rafter after the strength/rigidity of the solar cell module is increased by the solar panel and the like being held by the frame and therefore, the overall strength/rigidity is increased by the strength/rigidity of each member constituting a unit to have sufficient strength/rigidity as a member constituting a roof. As described above, the strength/rigidity of the unit is shared by the solar cell module and the processed rafter and therefore, there is no need to use an expensive member with high strength/rigidity for only one member as in the past, so that an increase in cost for the unit can be suppressed.

Further, the installation part of the first frame in the solar cell module is installed onto the processed rafter and a cap member is fixed to cover the upper surfaces of the opposite first frames and therefore, infiltration of rain water or the like from between the first frames can be prevented by the cap member. Moreover, the upper surfaces of the opposite first frames are covered with the cap member and therefore, the installation part is likely to be covered with the cap member, so that rain water and the like can be prevented from directly hitting the installation part and weather resistance can be improved by preventing inundation from the installation part or corrosion of the installation part.

Moreover, a plurality of supporting members of the processed rafter is successively installed stepwise and solar cell modules of the building-integrated photovoltaic power unit can be made stepwise by installing the solar cell modules on each supporting member and therefore, if roof members such as roofing tiles are also installed together, the solar cell modules can be brought in line with roofing tiles, so that appearance on the roof can be improved. Incidentally, upper solar cell modules (ridge side) and lower solar cell modules (eaves side) may partially be overlapped, thereby making downward drainage of rain water or the like easier.

A waterproof member made of an elastic body or the like may be arranged between the upper surface of the first frame in the solar cell module and the ceiling part of the cap member and accordingly, infiltration of rain water or the like to the side of the structure from between the upper surface of the first frame and the ceiling part can be prevented, so that waterproof performance of the building-integrated photovoltaic power unit can be improved and also reliability thereof can be increased.

In addition to the above configuration, the first frame of the solar cell module further includes: a first holding part holding an edge of the solar panel by fitting the edge of the solar panel thereto; and a second holding part holding an edge of the functional member below the first holding part, removable in a downward direction.

Accordingly, the solar panel and the functional member in a solar cell module are held by separate holding parts and therefore, compared with a case when the solar panel and the functional member are held together, fitting into the holding part can be prevented from loosening due to accumulated dimensional tolerances thereof, so that the solar panel and the functional member can each be firmly held.

Moreover, the solar panel is held by the first holding part through fitting and the functional member is held by the second holding part, and is removable in a downward direction. That is, the solar panel is held from a direction along the panel face thereof and the functional member is held from a direction (downward) perpendicular to the panel face and therefore, compared with a case when the solar panel and the functional member are held from a direction along the panel face, the functional member can be made to be held after the solar panel being first held and assembly work of the solar cell module can be simplified, so that costs needed for the solar cell module can be reduced.

Further, the functional member is held by the second holding part, and is removable, and therefore, the solar cell module can be converted to a unit capable of allowing light to come into a building through the solar panel by changing the unit to a state in which the functional members of predetermined solar cell modules are removed within the unit, so that needs of users and the like can easily be met.

In addition to the above configuration, the cap member further includes a leg extending downward from an undersurface of the ceiling part, the leg configured to abut each installation part of the first frame of the solar cell module.

According to the present invention, a leg of the cap member can come into contact with the installation part of the first frame and therefore, the ceiling part of the cap member can be prevented from significantly being bent to the side of the processed rafter by the leg being brought into contact with the installation part when the cap member is fixed to the processed rafter, so that the appearance of the cap member can be prevented from worsening. Moreover, by bringing the leg of the cap member into contact with the installation part, inundation to the side of the structure can be blocked, so that waterproof performance can still be improved.

The cap member may be formed in such a way that while the leg is fastened to the processed rafter by being in contact with the installation part of the first frame, the substantial center becomes higher in the width direction (the direction in which the installation part of the first frame extends, that is, the direction that becomes the horizontal direction when a building-integrated photovoltaic power unit is installed on a roof) of the ceiling part and accordingly, rain water or the like on the cap member can be drained to the right and left of the cap member to prevent the rain water or the like from stagnating on the cap member. Even when the leg is in contact with the installation part, the center of the ceiling part is high and thus, with an elastic force acting on the ceiling part itself, both ends of the ceiling part come into contact with the upper surface of the first frame with more force, so that the ceiling part and the first frame can be brought into closer contact and waterproof performance between the ceiling part and the first frame can still be improved. If the cap member is fixed to the processed rafter in the substantial center in the width direction, rain water or the like can be prevented from stagnating around a vis used to fix the cap member, so that infiltration of rain water or the like to the lower part of the cap member across a vis hole for vis can be prevented.

In addition to the above configuration, the first frame of the solar cell module further includes: a fitting groove configured to receive the leg of the cap member by fitting the leg of the cap member thereinto; and a pair of standing wall parts disposed side by side between the fitting groove and the solar panel in a direction in which the installation part extends, the pair of standing wall parts extending upward, and wherein the cap member further includes a drooping part drooping from an undersurface of the ceiling part in between the pair of standing wall parts of the first frame of the solar cell module.

According to the present invention, the first frame includes a pair of standing wall parts rising upward between a fitting groove and the solar panel, and the cap member includes a drooping part drooping between the pair of standing wall parts from the ceiling part and therefore, rain water or the like infiltrating from between the first frame and the ceiling part of the cap member can be prevented from infiltrating into the fitting groove in two stages by the pair of standing wall parts. Moreover, rain water or the like can be prevented from infiltrating by jumping over the pair of standing wall parts by the drooping part drooping between the pair of standing wall parts. Further, the leg of the cap member is made to fit into the fitting groove and therefore, rain water or the like can be blocked from infiltrating to the side of the structure by jumping over the fitting groove, so that waterproof performance of the building-integrated photovoltaic power unit can still be improved.

Moreover, the leg can be prevented from moving by causing the leg to fit into the fitting groove and therefore, an operation effect by the cap member can be reliably exhibited by fixing the cap member at a fixed position with respect to the first frame.

It is desirable to install the solar cell module on the supporting member of the processed rafter between the standing wall part arranged on the side closer to the fitting groove in the first frame and the fitting groove and accordingly, the pair of standing wall parts will be arranged between the position (installation position) where the first frame is installed on the processed rafter and the position where there is a possibility that rain water or the like infiltrates and the ceiling part of the cap member and the upper surface of the first frame come into contact. Therefore, reaching the installation position can be made difficult for rain water as much as possible, so that waterproof performance of the building-integrated photovoltaic power unit can be improved by preventing rain water or the like from infiltrating to the side of the structure across the vis hole after the installation position being inundated. Moreover, by arranging the installation position of the first frame between the outside standing wall part and the fitting groove, the position where the leg comes into contact will be the outermost position in the direction in which the installation part of the first frame extends. That is, the leg of the cap member can be positioned near the center in the width direction of the processed rafter and therefore, when the cap member is fixed to the processed rafter, the center of the ceiling part becomes harder to cave in, so that the appearance of the ceiling part can be prevented from worsening due to an undulating ceiling part.

In addition to the above configuration, the functional member of the solar cell module is a sheathing roof board.

According to the present invention, a sheathing roof board is used as the functional member in the solar cell module and therefore, the strength/rigidity of the solar cell module can be increased and durability and reliability can be increased by increasing the strength/rigidity of the whole building-integrated photovoltaic power unit. Since the sheathing roof board is integrated into the solar cell module, the sheathing roof board can be installed only by installing the solar cell module on the processed rafter, reducing the cost expended on the building-integrated photovoltaic power unit by simplifying assembly work.

According to the present invention, as described above, a building-integrated photovoltaic power unit that can easily be produced in a plant and has excellent weather resistance and high strength/rigidity can be provided.

DETAILED DESCRIPTION OF THE PREFERRED EMBODIMENTS

Figure 1:
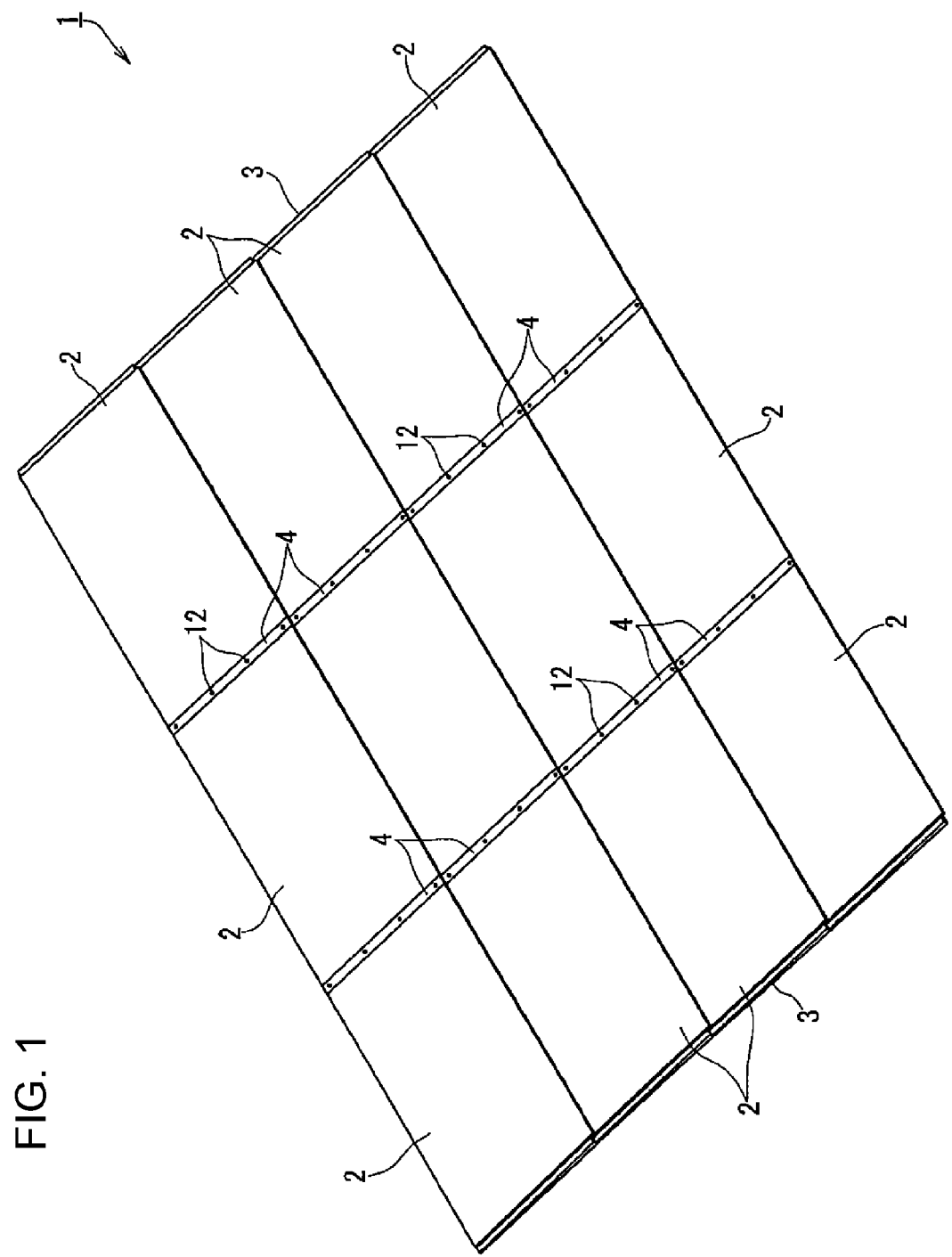
FIG. 1 is a perspective view showing a whole building-integrated photovoltaic power unit of the present invention.
Figure 2:
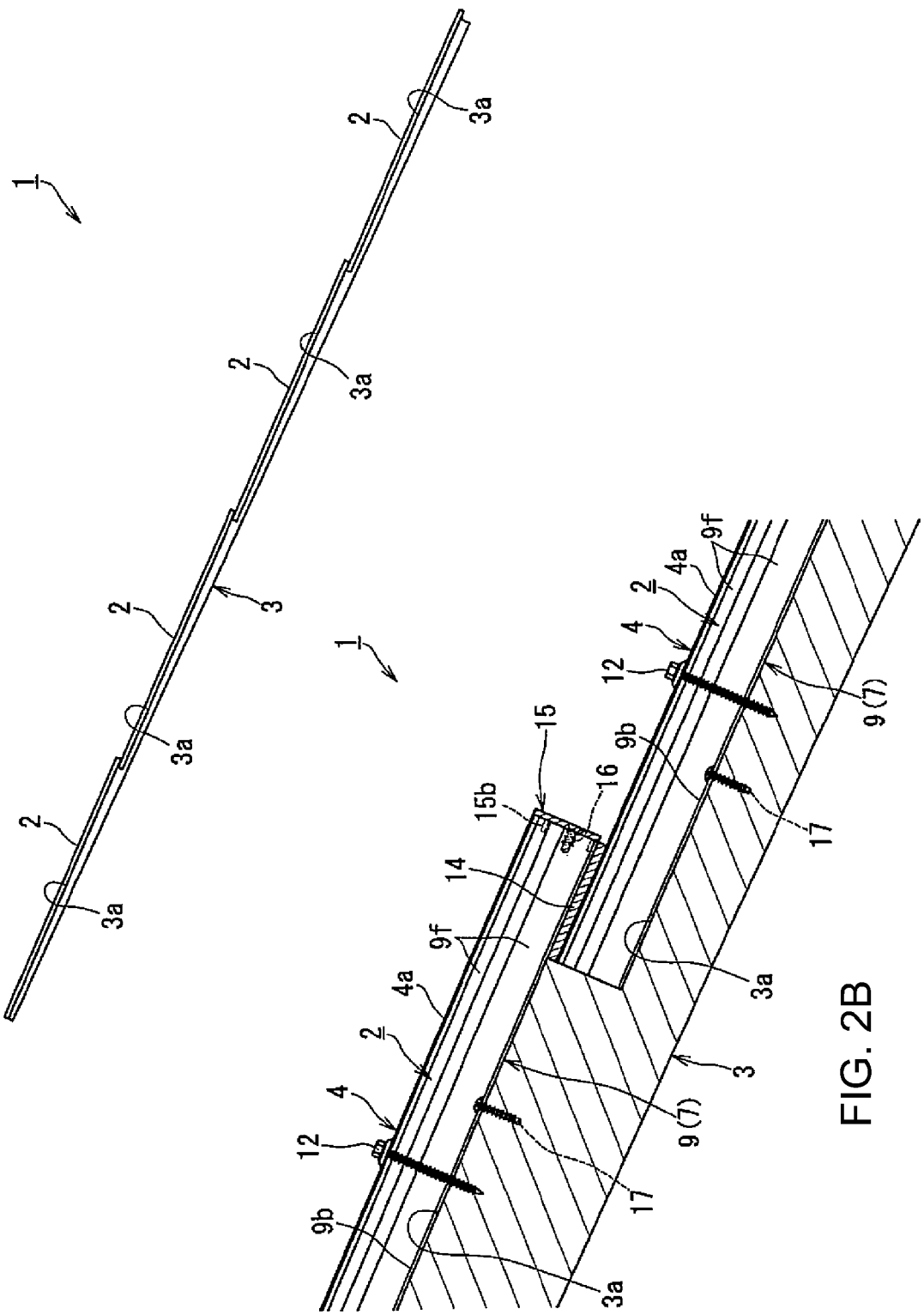
FIG. 2A is a side view of the building-integrated photovoltaic power unit of the present invention.
FIG. 2B is a side sectional view showing a side section by enlarging the side section.
Figure 3:
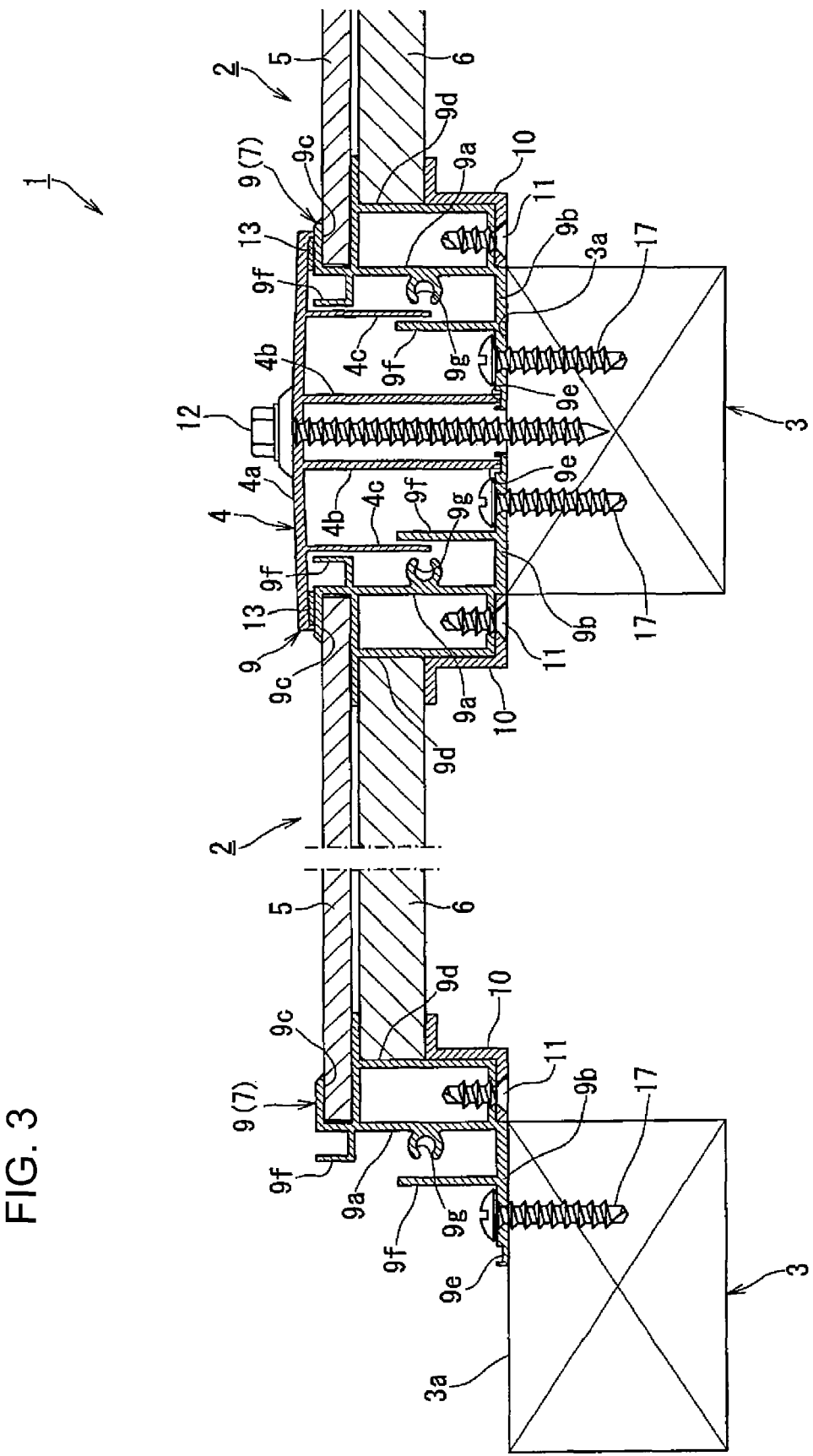
FIG. 3 is a sectional view of the building-integrated photovoltaic power unit of the present invention by cutting the unit in a horizontal direction.
Figure 4:
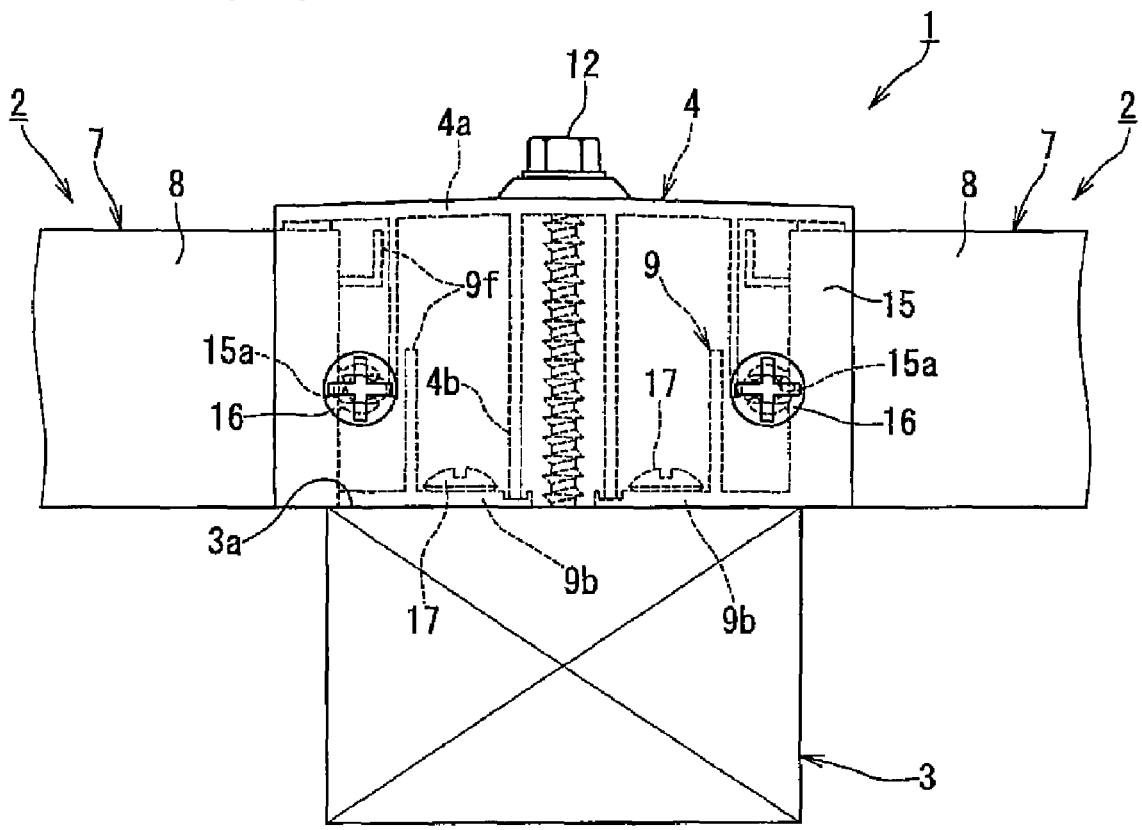
FIG. 4 is a diagram showing an eaves-side tip of the building-integrated photovoltaic power unit of the present invention by enlarging the eaves-side tip.
Figure 5:
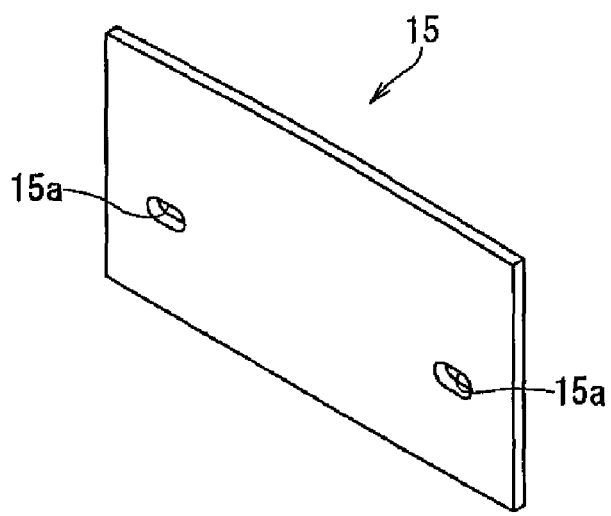
FIG. 5 is a perspective view showing a tip cap in the building-integrated photovoltaic power unit of the present invention.
Figure 6:
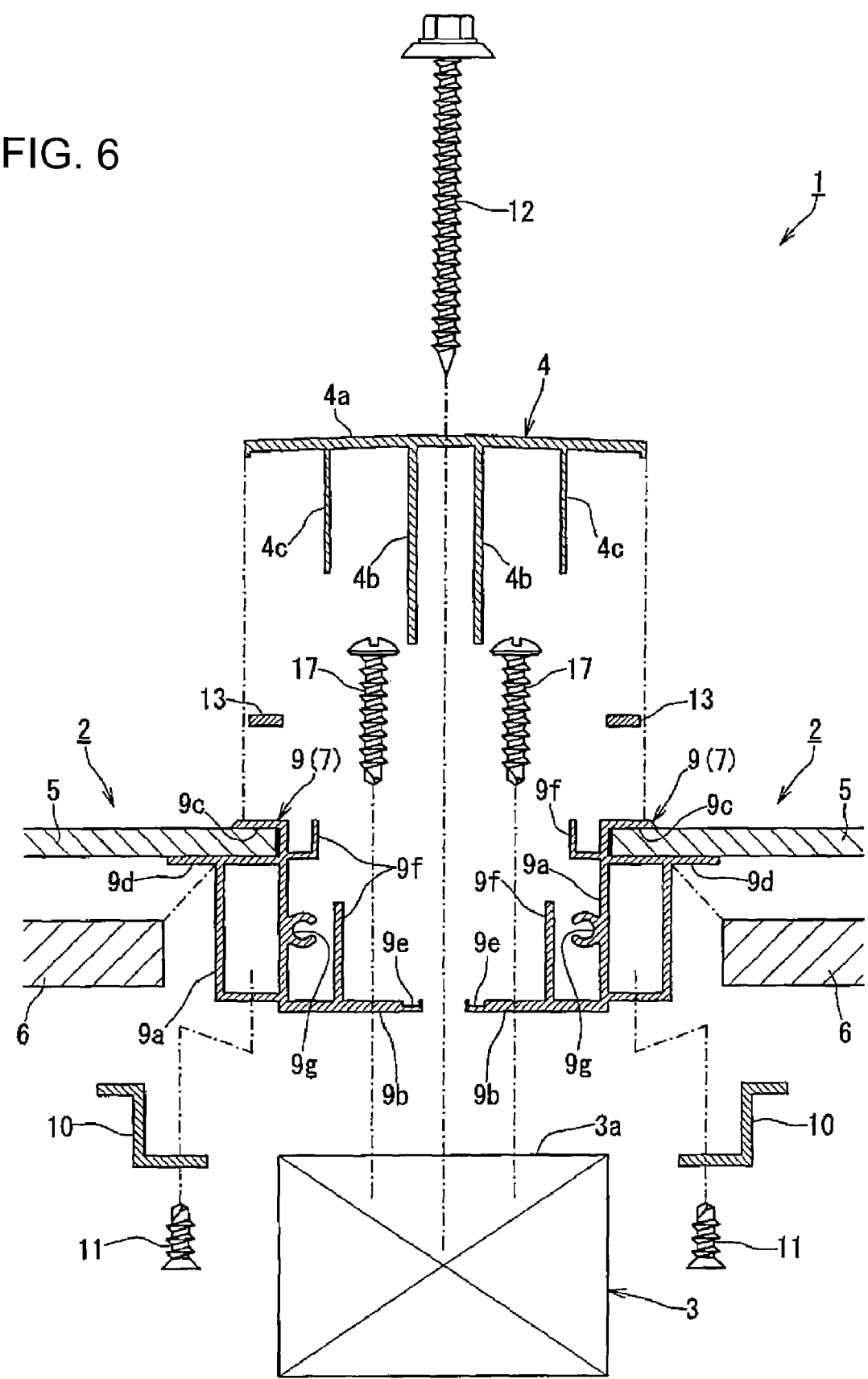
FIG. 6 is an exploded view shown by breaking down FIG. 3.

A building-integrated photovoltaic power unit that is a preferred embodiment of the present invention will be described below in detail with reference to FIGS. 1 to 6. FIG. 1 is a perspective view showing a whole building-integrated photovoltaic power unit of the present invention. FIG. 2A is a side view of the building-integrated photovoltaic power unit of the present invention and FIG. 2B is a side sectional view showing a side section by enlarging the side section. FIG. 3 is a sectional view of the building-integrated photovoltaic power unit of the present invention by cutting the unit in a horizontal direction and FIG. 4 is a diagram showing an eaves-side tip of the building-integrated photovoltaic power unit of the present invention by enlarging the eaves-side tip. FIG. 5 is a perspective view showing a tip cap in the building-integrated photovoltaic power unit of the present invention and FIG. 6 is an exploded view showing by breaking down FIG. 3. Further, FIG. 7 is an explanatory view showing by schematizing an example of a processed rafter in the present invention.

A building-integrated photovoltaic power unit 1 of the present embodiment includes a solar cell module 2 whose external shape is rectangular, a stepwise processed rafter 3 capable of supporting the solar cell module 2 and constituting a structure of a roof, and a cap member 4 covering upper surfaces of the solar cell modules 2 supported by the processed rafter 3 facing each other. The building-integrated photovoltaic power unit 1 is, as illustrated, unitization of a plurality of the solar cell modules 2 by causing each step of the stepwise processed rafter 3 as a building material to support both ends of the solar cell module 2.

The solar cell module 2 in the building-integrated photovoltaic power unit 1 of the present example includes a solar panel 5 in a flat plate shape, a functional member 6 in a plate shape arranged below the solar panel 5, and a frame body 7 holding peripheral ends of the functional member 6 and the solar panel 5. The frame body 7 includes a second frame 8 to hold an opposite edge of the solar panel 5 (an edge directed to the eaves side and the ridge side when installed on a roof) and a first frame 9 to hold an edge perpendicular to the second frame 8. In the present example, the functional member 6 is set as a material generally used for the sheathing roof board of a roof and is a unit in which a rafter and a sheathing roof board are integrated for the solar cell module 2.

As shown in FIGS. 3 and 6, the first frame 9 in the frame body 7 includes a body part 9a extending vertically and whose external shape is rectangular, an installation part 9b in a plate shape extending outward from a bottom edge of the body part 9a, a first holding part 9c arranged on the opposite side of the installation part 9b and holding an edge of the solar panel 5 by fitting, a second holding part 9d arranged below the first holding part 9c and holding an edge of the functional member 6, which is removable in a downward direction, a fitting groove 9e arranged on the upper surface at the tip of the installation part 9b, and a pair of standing wall parts 9f arranged side by side between the fitting groove 9e and the body part 9a (the first holding part 9c holding the solar panel 5) in a direction in which the installation part 9b extends and extends upward.

The first frame 9 has, as illustrated, the first holding part 9c arranged above the body part 9a and the second holding part 9d arranged on the side face (inside side face) of the body part 9a. In the present example, as illustrated, the functional member 6 inserted into the second holding part 9d is prevented from moving downward by a stationary plate 10 curved like a crank being fixed to the body part 9a by a vis 11 below the body part 9a so that the functional member 6 is held and is removable. That is, in the present example, a second holding part of the present invention is constituted by the second holding part 9d and the stationary plate 10.

The standing wall part 9f on the side closer to the fitting groove 9e of the pair of standing wall parts 9f rises from the installation part 9b and the standing wall part 9f on the side farther away from the fitting groove 9e (on the side closer to the first holding part 9c holding the solar panel 5) rises upward after extending a predetermined amount in a direction substantially parallel to the direction in which the installation part 9b from the outside side face of the first holding part 9c. A screwing groove 9g whose section has a substantially C shape is formed on the outside side face of the body part 9a.

On the other hand, though an illustration of a sectional shape thereof is omitted, the second frame 8 basically has a sectional shape obtained by eliminating the installation part 9b, the standing wall parts 9f, and the screwing groove 9g from the first frame 9. The second frame 8 and the first frame 9 are a mold material in a long shape molded by extruding aluminum or the like and the overall strength/rigidity thereof is increased by the rectangular body part 9a.

Figure 7A:
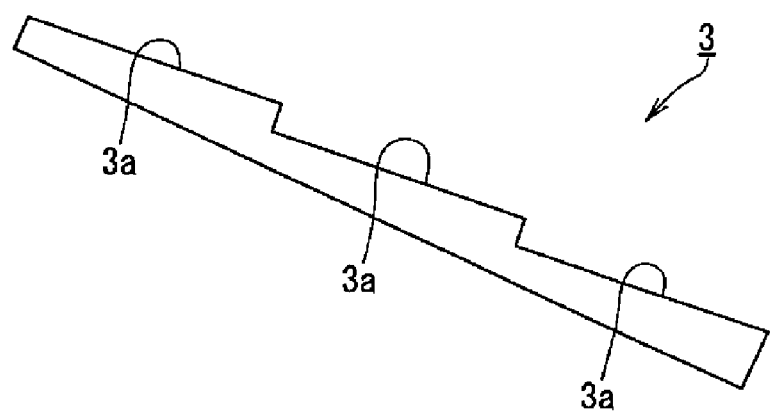
FIG. 7 is an explanatory view by schematizing an example of a processed rafter in the present invention.

As shown in FIGS. 2 and 7A, the processed rafter 3 in the building-integrated photovoltaic power unit 1 in the present example has a plurality of supporting members 3a of the length (the length 0.8 to 1 times the length of the first frame 9 and in the present example, the length about 0.97 times the length thereof) corresponding to the solar cell module 2 successively installed on the upper surface thereof in the longitudinal direction of the processed rafter 3. The supporting member 3a is tilted by a predetermined angle with respect to the bottom of the processed rafter 3 and the upper surface of the processed rafter 3 becomes stepwise by successively installation the supporting member 3a in the longitudinal direction. The height between the supporting members 3a (the height of one step) is set slightly higher than the height (thickness) of the solar cell module 2.

Figure 7B:
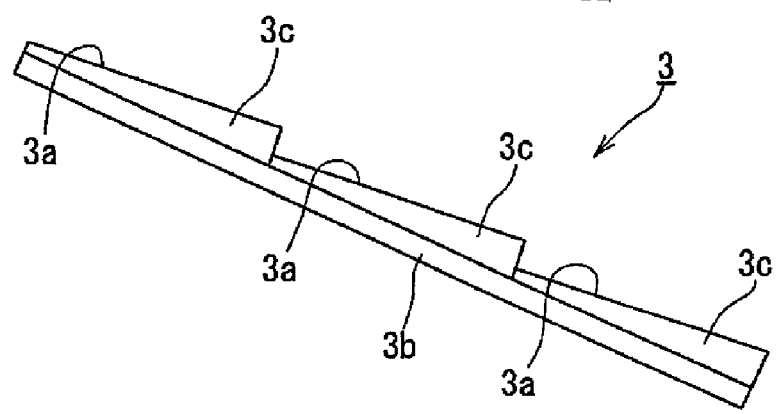
Figure 7C:
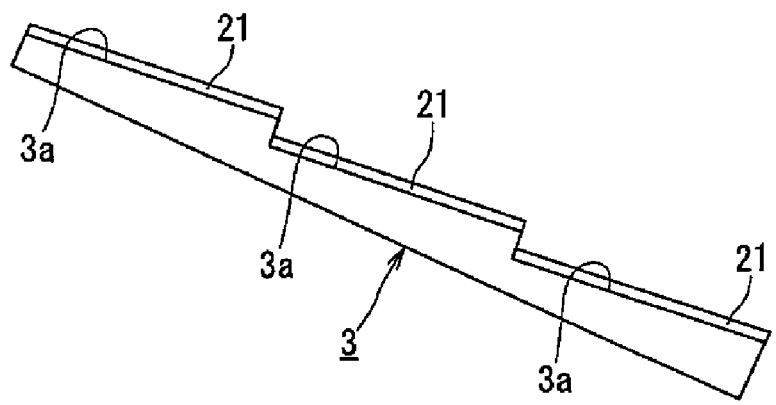

The processed rafter 3 has, as illustrated, a width (the length in the horizontal direction of a roof when installed on the roof) that allows installation of each solar cell module while the installation parts 9b of the first frames 9 in the solar cell modules 2 arranged adjacent to each other face each other. Materials of the processed rafter 3 include timber for construction and steel materials. As shown in FIG. 7B, the processed rafter 3 may have a form in which stepwise formation members 3c in a substantially triangular (trapezoidal) shape equipped with the supporting member 3a are successively installed on the upper surface of a through member 3b in a rod shape.

The cap member 4 in the building-integrated photovoltaic power unit 1 of the present example includes, as illustrated, a ceiling part 4a covering the upper surfaces of the first frames 9 while the installation part 9b of the first frame 9 in the solar cell module 2 is installed onto the supporting member 3a of the processed rafter 3 mutually to each other, a pair of legs 4b extending downward from the undersurface of the ceiling part 4a and capable of being brought into contact with the fitting groove 9e of the installation part 9b of the first frame 9 by fitting thereinto, and a pair of drooping parts 4c drooping between the leg 4b and an edge of the ceiling part 4a from the undersurface of the ceiling part 4a to between the pair of standing wall parts 9f in the first frame 9.

The cap member 4 is, as illustrated, directly installed on the processed rafter 3 by a vis 12 by passing through the ceiling part 4a substantially in the center in the width direction. The ceiling part 4a is formed in such a way that while the cap member 4 is installed on the processed rafter 3, the substantial center is higher in the width direction. Accordingly, rain water or the like can be drained to both sides of the cap member 4 and also both ends of the ceiling part 4a come into contact with the upper surface of the first frame 9 with a predetermined elastic force. Like the second frame 8 and the first frame 9, the cap member 4 in the present example is a mold material in a long shape molded by extruding aluminum or the like.

The building-integrated photovoltaic power unit 1 in the present example further includes a waterproof member 13 arranged between the upper surface of the first frame 9 in the solar cell module 2 and the ceiling part 4a of the cap member 4. The waterproof member 13 is made of an elastic member such as rubber and silicon and can prevent infiltration of rain water or the like to the side of the structure from between the upper surface of the first frame 9 and the ceiling part 4.

As shown in FIG. 2, the building-integrated photovoltaic power unit 1 in the present example further includes a waterproof member 14 arranged between the solar cell modules 2 stepwise supported by the processed rafter 3. The waterproof member 14 is made of an elastic member such as rubber and silicon and can prevent infiltration of rain water or the like to the side of the structure from between the solar cell modules 2 overlapped vertically.

Further, the building-integrated photovoltaic power unit 1 in the present example includes, as shown in FIGS. 4 and 5, a tip cap 15 that closes a gap between the solar cell modules 2 formed on the side directed to the eaves side when installed on a roof by supporting the solar cell module 2 through the processed rafter 3 adjacent to each other. The tip cap 15 has a plate shape and includes a pair of through-holes 15a composed of long holes at a position corresponding to the screwing groove 9g of the first frame 9. The tip cap 15 is fixed to each of the solar cell modules 2 by screwing a pan-head vis 16 into the screwing groove 9g of the first frame 9 through the through-hole 15a so that a gap between the solar cell modules 2 can be closed.

Next, an assembly method of the building-integrated photovoltaic power unit 1 in the present embodiment will be described. First, the first holding part of the second frame 8 is made to hold each opposite edge of the solar panel 5. Subsequently, the first holding part 9c of the first frame 9 is made to hold each edge of the solar panel 5 perpendicular to the second frame 8, and the second frame 8 and the first frame 9 are fixed by a vis (not shown) to form the frame body 7 holding the outer circumference of the solar panel 5. Then, after the functional member 6 in a plate shape being inserted into the second frame 8 and the second holding part 9d of the first frame 9 from below the frame body 7, the stationary plate 10 is fixed to the second frame 8 and the body part 9a of the first frame 9 by the vis 11 to cause the stationary plate 10 to hold the functional member 6. Accordingly, the solar cell module 2 is assembled.

Subsequently, the solar cell module 2 is first installed on the supporting member 3a on the step closest to the eaves side (in FIG. 2, the rightmost supporting member 3a) when installed on a roof among the supporting members 3a stepwise formed on the processed rafter 3. First, after an installation part 2b of a first frame of the solar cell module 2 being placed on the upper surface of the supporting member 3a, one of the second frames 8 is brought into contact with a stepped portion between the successively installed supporting members 3a and the supporting member 3a.

Then, in this state, the first frame 9 of the solar cell module 2 is installed onto the supporting member 3a by screwing a predetermined vis 17 into the processed rafter 3 through the installation part 9b between the fitting groove 9e in the installation part 9b of the first frame 9 and the outside standing wall part 9f. Using the vis 17, the installation part 9b is fixed to the supporting member 3a at appropriate intervals in the longitudinal direction of the first frame 9.

After one of the first frames 9 of the solar cell module 2 being installed onto the processed rafter 3, next the other first frame 9 is installed onto the supporting member 3a of the other processed rafter 3 in the same manner as described above. When the first frame 9 is installed onto the processed rafter 3, the first frame 9 is installed onto the supporting member 3a in the same step as that of the supporting member 3a of the processed rafter 3 installed before. Then, after the first frames 9 at both edges of the solar cell module 2 being installed onto the processed rafter 3, the other solar cell module 2 is placed on the supporting member 3a of the processed rafter 3 so that the first frame 9 thereof is opposite to the first frame 9 of the solar cell module 2 installed first, and the installation part 9b of the first frame 9 is fixed to the supporting member 3a using the vis 17 in the same manner as described above.

Accordingly, the first frames 9 of the solar cell modules 2 adjacent to each other face each other on the supporting member 3a of the processed rafter 3 and the waterproof member 13 in a long shape is placed on the upper surface of these opposite first frames 9. Subsequently, the cap member 4 is arranged on the waterproof member 13 in such a way that the ceiling part 4a thereof covers an upper part of the first frames 9 and also the leg 4b of the cap member 4 is fitted into the fitting groove 9e of the first frame 9.

By screwing the vis 12 into the processed rafter 3 through the ceiling part 4a substantially in the center in the width direction of the ceiling part 4a in this state, the cap member 4 is fixed to the processed rafter 3. By fixing the cap member 4 using the vis 12, the bottom edge of the leg 4b of the cap member 4 comes into contact with the bottom of the fitting groove 9e and the waterproof member 13 is compressed by both ends of the ceiling part 4a to ensure watertightness between the cap member 4 and the first frame 9.

After the cap member 4 being installed, the tip cap 15 is fixed to each of the first frames 9 by bringing the tip cap 15 into contact with the eaves-side tip between the solar cell modules 2 on the side directed to the eaves side when installed on a roof (the opposite side of the side that comes into contact with the step between the supporting members 3a of the processed rafter 3) and screwing the vis 16 into the screwing groove 9g of the first frame 9 via the through-hole 15a. When the tip cap 15 is fixed, a predetermined waterproof seal may be inserted between the tip cap 15, and the solar cell module 2 and the cap member 4. The tip cap 15 and the cap member 4 may be installed in any order.

By repeating the above work, the solar cell module 2 and the cap member 4 are installed in the width direction one by one via the processed rafter 3 in accordance with the width of the building-integrated photovoltaic power unit 1 to be constructed. Then, after the solar cell modules 2 being installed on the supporting member 3a of the first step in each of the processed rafters 3, the solar cell module 2 and the cap member 4 are installed on the next step of the processed rafter 3 according to the same procedure as described above.

When the solar cell modules 2 are installed on any step after the first step, the waterproof member 14 in a long shape is inserted into a portion where the solar cell module 2 overlaps with the solar cell module 2 below. The length of the waterproof member 14 may be a length corresponding to one solar cell module 2 or one corresponding to the width of the building-integrated photovoltaic power unit 1.

By installing the solar cell modules 2 on the supporting members 3a on each step of the stepwise processed rafter 3 in this manner, the building-integrated photovoltaic power unit 1 in the present example can be constructed. Then, by installing the constructed building-integrated photovoltaic power unit 1 on a roof of a building or the like at the construction site, a plurality of the solar cell modules 2 can be installed together with construction of the roof. The above assembly may be carried out in a predetermined plant, on a level ground at the construction site, or on a roof.

According to the building-integrated photovoltaic power unit 1 in the present embodiment, as described above, after the installing part 9b of the solar cell module 2 being installed on the supporting member 3a of the processed rafter 3, it is only necessary to install the cap member 4 onto the processed rafter 3 so that the building-integrated photovoltaic power unit 1 can be constructed by the simple work of stacking each structural member and the unit can easily be produced in a plant or the like.

The solar cell module 2 is installed onto the processed rafter 3 after the strength/rigidity of the solar cell module 2 is increased by the solar panel 5 and the functional member 6 being held by the frame body 7 and therefore, the overall strength/rigidity is increased by the strength/rigidity of each member constituting a unit to have sufficient strength/rigidity as a member constituting a roof. Moreover, as described above, the strength/rigidity of a unit is shared by the solar cell module 2 and the processed rafter 3 and there is no need to use an expensive member with high strength/rigidity for only one member as in the past, so that an increase in cost for the unit can be suppressed.

Further, the cap member 4 is fixed in such a way that the upper surfaces of the first frames 9 in the opposite solar cell modules 2 are covered and therefore, rain water or the like can be prevented from infiltrating from between the first frames 9 by the cap member 4. Moreover, the pair of standing wall parts 9f are provided inside the fitting groove 9e and also the cap member 4 includes the drooping parts 4c drooping between the pair of standing wall parts 9f and the leg 4b fitted into the fitting groove 9e and therefore, even if rain water or the like infiltrates from between the upper surface of the first frame 9 and the ceiling part 4a of the cap member 4, it is as difficult as possible for the rain water to reach the processed rafter 3 or the rear side of the unit so that the building-integrated photovoltaic power unit 1 can be made to have high waterproof performance.

Moreover, the solar cell modules 2 are stepwise supported by the processed rafter 3 and therefore, if roof members such as roofing tiles are also installed together, the solar cell modules 2 can be brought in line with the roof members so that appearance on the roof can be improved.

In the foregoing, the present invention has been described by referring to a preferred embodiment, but the present invention is not limited to such an embodiment and, as will be shown below, various modifications and design changes can be made without deviating from the scope of the present invention.

That is, in the present embodiment, the functional member 6 of the solar cell module 2 has a function of a sheathing roof board, but for example, a functional member having sound insulation characteristics, fireproof/heat insulating characteristics or the like may be used and accordingly, a building-integrated photovoltaic power unit excellent in sound insulation or fire resistance can be created. Moreover, in accordance with a floor plan of a building, different functional members may be used in the same unit.

Figure 8:
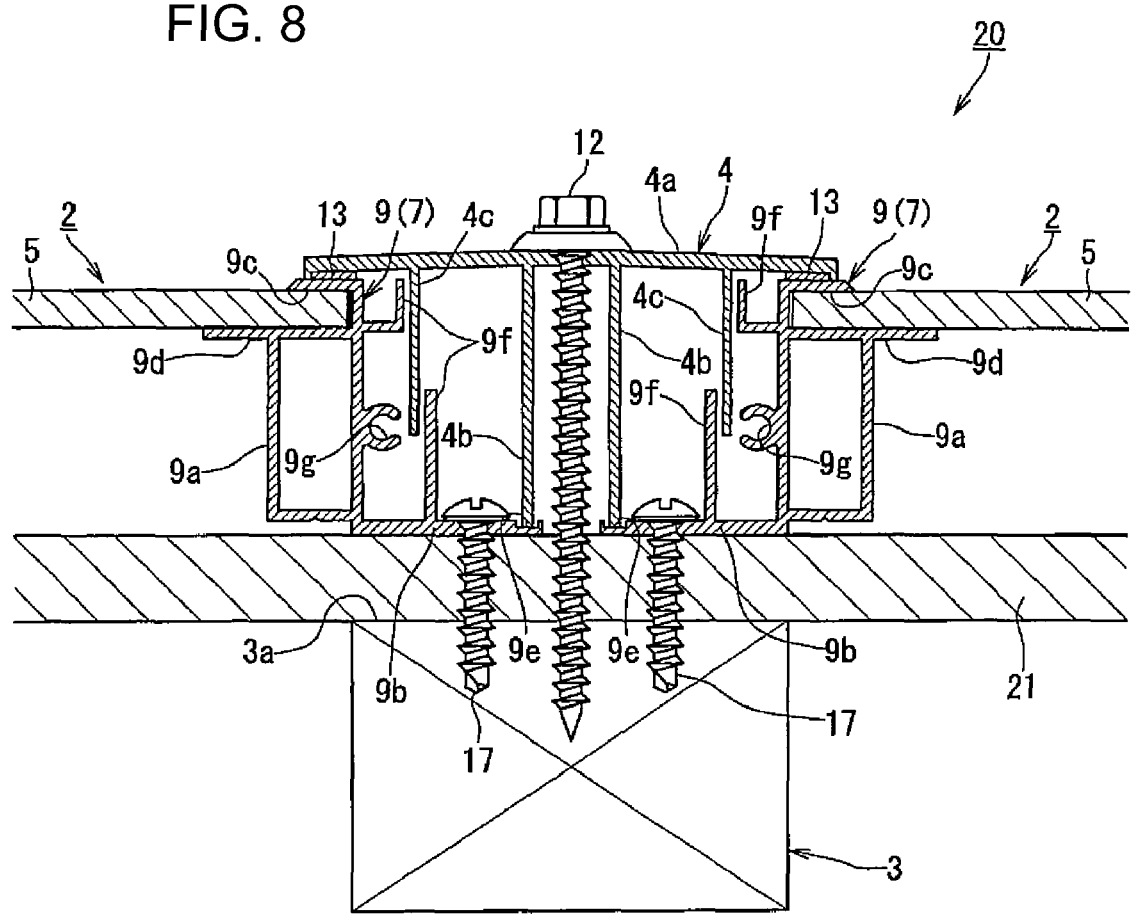
FIG. 8 is a sectional view showing another embodiment of the building-integrated photovoltaic power unit.

In the present embodiment, the solar cell module 2 is provided with the functional member 6 having the function of a sheathing roof board, but for example, a building-integrated photovoltaic power unit 20 shown in FIG. 8 may be constructed. The building-integrated photovoltaic power unit 20 is constructed by placing a sheathing roof board 21 of the same length as the width of the unit on each of the supporting members 3a of the processed rafter 3 (see FIG. 7C) and then, like the above embodiment, the first frame 9 of the solar cell module 2 is fixed by the vis 17 together with the sheathing roof board 21. The building-integrated photovoltaic power unit 20 can also achieve the same operation effect as the above one and in addition, the strength/rigidity of the whole unit can be increased because the sheathing roof board 21 is continuous throughout the total width of the unit.

In the building-integrated photovoltaic power unit 20, the solar cell module 2 from which the functional member 6 is omitted is shown, but the solar cell module 2 including the functional member 6 having sound insulation characteristics, fireproof/heat insulating characteristics or the like may also be installed. In FIG. 8, the same reference numerals are attached to the same components as those in the above embodiment. In this example, the sheathing roof board 21 is placed on the supporting member 3a of the stepwise processed rafter 3 and therefore, even if rain water or the like infiltrates to the lower side of the solar cell module 2, the rain water can be drained to the eaves side across the upper surface of the sheathing roof board 21 by installing the unit on a roof, so that infiltration of rain water or the like into a building can be prevented. Moreover, a structure like a roof member such as a conventional tile in which rain water or the like flowing across the upper surface of the sheathing roof board 21 flows to the eaves side by jumping over the roof member is not adopted and therefore, rain water or the like can be prevented from stagnating at ridge-side edges of the roof member, so that rain water or the like can be drained to the eaves side satisfactorily.

The solar cell module 2 in the building-integrated photovoltaic power unit 1 according to the present embodiment may be used, as described above, as a roof unit or like a conventional solar cell module alone separately from the processed rafter 3. In such a case, the solar cell module 2 in the present example holds the functional member 6 and is removable, and thus, if, for example, fireproof performance is needed, the solar cell module 2 can be supplied by installing the functional member 6 having fireproof performance and if fireproof performance is not specifically needed, the solar cell module 2 can be supplied by removing the functional member 6, so that user needs can easily be met.

Figure 7D:
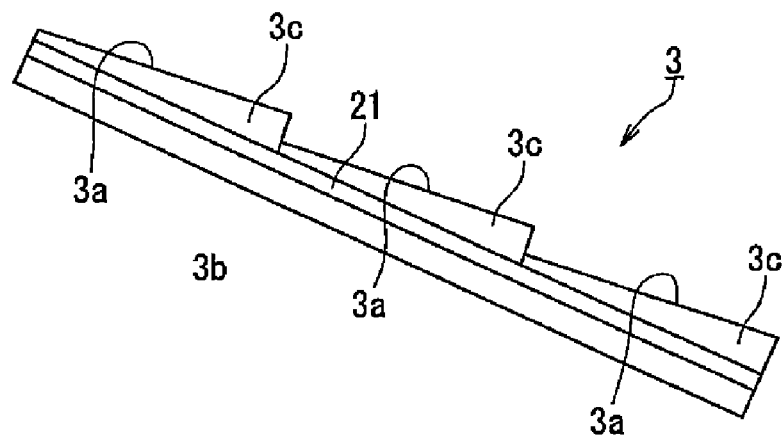

In the above examples, a stepwise processed rafter formed integrally (FIG. 7A), a processed rafter formed by successively installing the stepwise formation member 3c on the through member 3b (FIG. 7B), and a processed rafter formed by placing the sheathing roof board 21 on each step formed stepwise and integrally (FIG. 7C) have been shown as the processed rafter 3, but as shown in FIG. 7D, after the sheathing roof board 21 being placed on the upper surface of the through member 3b in a rod shape, further the stepwise formation member 3c may be successively installed thereon, which can achieve the same operation effect as the above one. If the stepwise formation member 3c is used, compared with a case of integral formation, material yields can be improved.

Further, in the above embodiment, the cap member 4 equipped with the leg 4b is shown, but for example, as shown in FIGS. 9A to 9F, cap members 30 not equipped with a leg may also be used. In the examples in FIG. 9, the same reference numerals are attached to the same components as those in the above examples and a detailed description thereof is omitted. First, in the example in FIG. 9A, the cap member 30 includes a ceiling part 30a having a width that can be arranged between outside side faces of the first holding parts 9c of the opposite first frames 9 and a drooping part 30b drooping between the pair of standing wall parts 9f from the undersurface of the ceiling part 30a to the first frame 9. In this example, the waterproof member 13 is placed on a surface extending in the lateral direction of the standing wall parts 9f formed in a substantial L shape closer to the body part 9a in the first frame 9 and an edge of the ceiling part 30a in the cap member 30 is placed thereon. The example in FIG. 9B has a form in which the drooping part 30b is eliminated from the cap member 30 in FIG. 9A. In the example in FIG. 9C, the cap member 30 has a width that covers the upper surfaces of the first holding parts 9c of the opposite first frames 9. In examples below including this example, the first frame 9 has one standing wall part 9f.

Figure 9A:
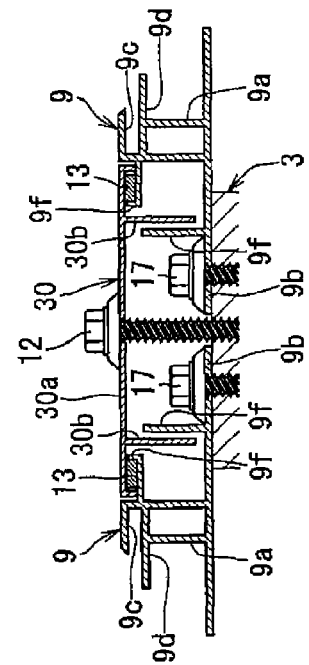
FIG. 9 is a sectional view showing another embodiment of a cap member in the present invention.
Figure 9B:
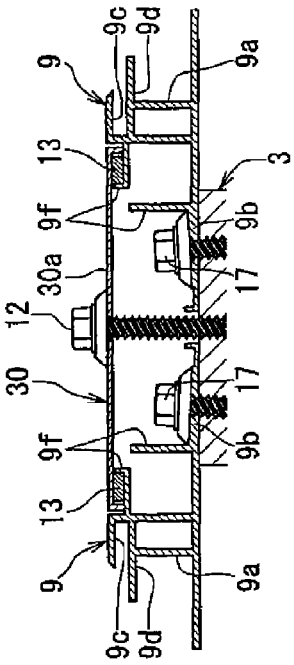
Figure 9C:
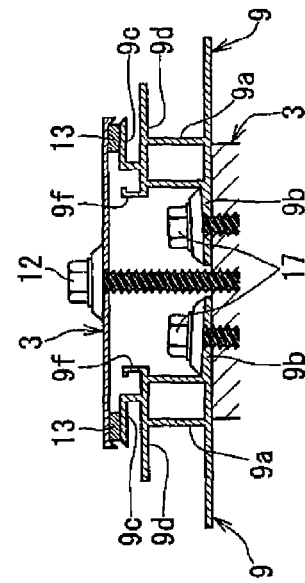
Figure 9D:
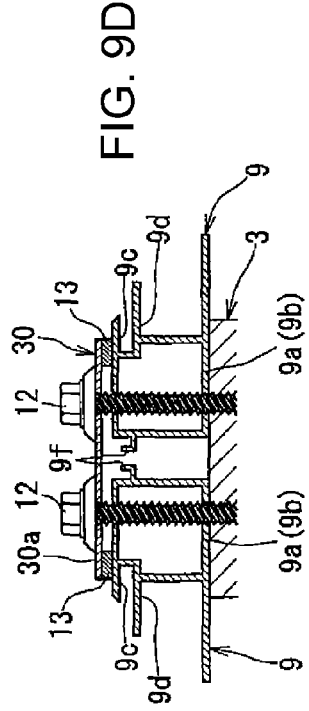
Figure 9E:
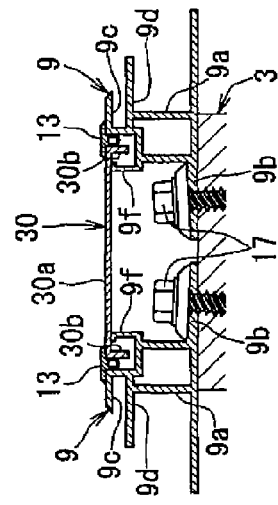

Further, in the example in FIG. 9D, the cap member 30 has a width that covers the upper surfaces of the first holding parts 9c of the opposite first frame 9, the installation part 9b of the first frame 9 is changed to the body part 9a, and the body part 9a of the first frame 9 is installed onto the processed rafter 3 by the vis 12 together with the cap member 30. In the example in FIG. 9E, the ceiling part 30a of the cap member 30 has a width that can be arranged between outside side faces of the first holding parts 9c of the opposite first frames 9, the drooping parts 30b are arranged at both ends in the width direction of the ceiling part 30a, the cap member 30 is installed by the waterproof member 13 elastically inserted between the drooping part 30b and the outside side face of the first holding part 9c in the first frame 9. In this example, the drooping part 30b of the cap member 30 droops between the first holding part 9c in the first frame 9 and the standing wall part 9f.

Figure 9F:
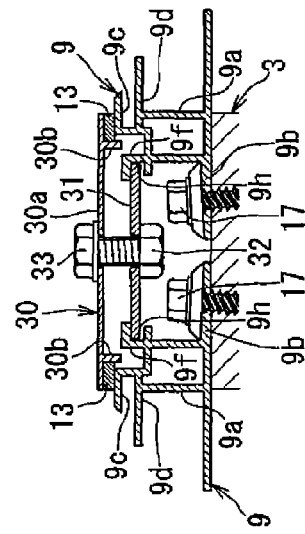

In the example in FIG. 9F, the ceiling part 30a of the cap member 30 has a width that covers the upper surfaces of the first holding parts 9c of the opposite first frame 9 and the cap member 30 is installed by forming a groove 9h released outward in the horizontal direction on the outside side face of the standing wall part 9f in the first frame 9, inserting a supporting metal fitting 31 into the opposite groove 9h for support, and fastening a bolt 33 from above the cap member 30 to a nut 32 fixed to the supporting metal fitting 31. In this example, the drooping part 30b of the cap member 30 is arranged so that the drooping part 30b droops between the first holding part 9c in the first frame 9 and the standing wall part 9f.

Thus, also in each example in FIG. 9, a space between the opposite first frames 9 can be closed by the cap member 30 in a watertight state, so that the same operation effect as the above one can be achieved. In the examples in FIGS. 9B, 9C, 9E, and 9F, the upper surface of the installation part 9b of the first frame 9 is tilted, and the vis 17 is screwed into the processed rafter in a slanting direction. While the second holding part 9d capable of holding the functional member 6 can be fitted and held in the direction along the surface thereof in the examples in FIG. 9, like the embodiment in FIG. 2, the second holding part 9d may be held removably from below the solar cell module 2.

What is claimed is:

1. A building-integrated photovoltaic power unit, comprising: a solar cell module including a solar panel in a flat shape, a plate-shaped member disposed below the solar panel, and a frame body including a first frame formed with an installation part extending outward and holding the plate-shaped member and said solar panel, the frame body holding the plate-shaped member and the solar panel so as to enclose a peripheral end thereof; a plurality of processed rafters including a supporting member having a length corresponding to the solar cell module and, configured as a structure of a roof, each rafter having a width to allow installation parts of first frames of different solar cell modules to be installed thereon in a state where a plurality of supporting members are successively installed stepwise in a longitudinal direction; and a cap member fixed to the plurality of processed rafters, the cap member including a ceiling part covering upper surfaces of the first frames of the solar cell modules installed such that the respective installation parts face each other on an upper surface of the processed rafter.

2. The building-integrated photovoltaic power unit according to claim 1, wherein
the first frame of the solar cell module further includes:
a first holding part holding an edge of the solar panel by fitting the edge of the solar panel thereto; and
a second holding part holding an edge of the plate-shaped member below the first holding part, removable in a downward direction.

3. The building-integrated photovoltaic power unit according to claim 1, wherein
the cap member further includes a leg extending downward from an undersurface of the ceiling part, the leg configured to abut each installation part of the first frame of the solar cell module.

4. The building-integrated photovoltaic power unit according to claim 2, wherein
the cap member further includes a leg extending downward from an undersurface of the ceiling part, the leg configured to abut each installation part of the first frame of the solar cell module.

5. The building-integrated photovoltaic power unit according to claim 3, wherein
the first frame of the solar cell module further includes:
a fitting groove configured to receive the leg of the cap member by fitting the leg of the cap member thereinto; and
a pair of standing wall parts disposed side by side between the fitting groove and the solar panel in a direction in which the installation part extends, the pair of standing wall parts extending upward, and wherein
the cap member further includes downward extension extending downward from undersurface of the ceiling part in between the pair of standing wall parts of the first frame of the solar cell module.

6. The building-integrated photovoltaic power unit according to claim 4, wherein
the first frame of the solar cell module further includes:
a fitting groove configured to receive the leg of the cap member by fitting the leg of the cap member thereinto; and
a pair of standing wall parts disposed side by side between the fitting groove and the solar panel in a direction in which the installation part extends, the pair of standing wall parts extending upward, and wherein
the cap member further includes a downward extension extending downward from an undersurface of the ceiling part in between the pair of standing wall parts of the first frame of the solar cell module.

7. The building-integrated photovoltaic power unit according to claim 1, wherein
the functional member of the solar cell module is a sheathing roof board.

* * * * *